United States Patent [19]
Cook et al.

[11] Patent Number: 5,805,769
[45] Date of Patent: Sep. 8, 1998

[54] ADJUSTABLE ELLIPSOIDAL REFLECTOR FOR FOOD HEATING APPARATUS

[75] Inventors: Edward R. Cook, Cedar Rapids, Iowa; Irl W. Smith, Concord, Mass.; Joseph R. Adamski, Cedar Rapids, Iowa

[73] Assignee: Amana Company, L.P., Amana, Iowa

[21] Appl. No.: 619,415

[22] Filed: Mar. 21, 1996

[51] Int. Cl.$^6$ .................................................. F21V 7/00
[52] U.S. Cl. .......................... 392/421; 392/422; 362/281
[58] Field of Search .................................. 392/418–421, 392/416, 422–424, 426–429, 411–415, 417; 362/281–284, 319; 250/504 R, 495.1; 219/405, 411; 34/266, 270, 273

[56] References Cited

U.S. PATENT DOCUMENTS

| | | | |
|---|---|---|---|
| 3,099,403 | 7/1963 | Strawick | 250/504 R |
| 3,600,553 | 8/1971 | Costello | 392/421 |
| 3,763,348 | 10/1973 | Costello | 392/418 |
| 4,156,626 | 5/1979 | Souder | 392/419 |
| 4,836,138 | 6/1989 | Robison et al. | 219/405 |
| 5,426,308 | 6/1995 | Sudduth et al. | 250/504 R |

FOREIGN PATENT DOCUMENTS

| | | | |
|---|---|---|---|
| 383360 | 10/1923 | Germany | 392/421 |
| 2024996 | 12/1971 | Germany | 392/423 |
| 914029 | 3/1982 | U.S.S.R. | |
| 2225549 | 6/1990 | United Kingdom | 392/421 |

*Primary Examiner*—Tu B. Hoang
*Attorney, Agent, or Firm*—Marshall, O'Toole, Gerstein, Murray & Borun

[57] ABSTRACT

An ellipsoidal reflector is provided for a light energy emitting lamp which is used as a heating element within an oven. Because an ellipsoidal reflector is used, the light energy emitting lamp may be positioned at the first focal point of the ellipsoidal reflector in order to concentrate light reflected by the ellipsoidal reflector on the food being cooked. Accordingly, a charbroiled surface effect common to gas or electric cooking grills is produced. The light energy emitting lamp may also be moved away from the first focal point so that light is reflected by the ellipsoidal reflector more uniformly.

20 Claims, 6 Drawing Sheets

5,805,769

ADJUSTABLE ELLIPSOIDAL REFLECTOR FOR FOOD HEATING APPARATUS

TECHNICAL FIELD OF THE INVENTION

The present invention is directed to an ellipsoidal reflector for a heating appliance such that the ellipsoidal reflector reflects energy emitted by an energy emitting device of the heating appliance.

BACKGROUND OF THE INVENTION

Heating appliances for heating objects have long been known. One such heating appliance is an oven for heating foods. A typical oven includes both a bake heating element and a broil heating element. The bake heating element is positioned adjacent and parallel to a floor of the oven, and the broil heating element is positioned adjacent and parallel to a ceiling of the oven.

When baking, the desired oven temperature is selected by the operator, and the bake heating element is activated to raise the oven temperature to the selected temperature. Once the oven temperature reaches the selected temperature, the bake heating element is cycled on and off, in response to the actual oven temperature as sensed by an oven temperature sensor, in order to maintain the oven temperature at the selected temperature. Although the broil heating element may also by cycled on and off at a reduced power level during a baking cycle to lightly brown the surface of certain foods, baking predominantly results from convection heating, which is the transfer of heat from the heating elements to the food by heating the air within the oven.

When broiling, the broil heating element is selected and is continuously activated at full power. During broiling, the bake heating element is typically not used. As is well known, broiling is accomplished by radiant heat transfer. More specifically, rather than heating the food within the oven by convection heating as is done during baking, the heating of foods during broiling results predominantly from infrared energy radiated from the broil heating element to the surface of the food.

Typically, the heating elements within an electric oven are resistive elements. Current is supplied to these elements which causes the heating elements to heat. During convection heating, the heat from the elements heat the air contained within the oven, and that air transfers the heat to the foods within the oven. The current flowing through the resistive heating elements also causes the heating elements to emit infrared energy which is used typically during broiling.

More recently, microwave elements have been used to produce microwave energy to heat food within the oven. Still more recently, high intensity sources having a very high power density have been used within ovens to emit light energy. The light energy is directed to the surface of the food to be cooked. The speed of the cooking process is directly dependent on the spectral reflectance of the food, the food's ability to conduct heat into its interior in a timely fashion, and the mass of the food.

The energy produced by the heating elements within an oven is typically distributed uniformly throughout the cooking area. To enhance the uniformity of energy distribution within an oven, reflectors are sometimes used behind the heating elements in order to prevent significant portions of the energy produced by the heating elements from being dissipated into the walls of the oven. These reflectors may be, for example, parabolic reflectors. When a heating element is placed at the focus of a parabolic reflector, the parabolic reflector reflects energy emitted by the heating element and uniformly distributes that energy over the cooking surface. Ovens which perform in this manner cannot achieve a charbroiled surface effect which is commonly produced by gas or electric cooking grills.

The present invention is intended to solve one or more of the problems discussed above.

SUMMARY OF THE INVENTION

According to a first aspect of the present invention, a food processing oven using light energy comprises an oven cabinet, a light emitting device, an ellipsoidal reflector, and a support. The light emitting device is arranged to emit light energy. The ellipsoidal reflector is arranged to reflect light energy emitted by the light emitting device to food to be heated. The support is arranged to support the light emitting device and the ellipsoidal reflector to the oven cabinet.

According to another aspect of the present invention, a food cooking apparatus for cooking food by the use of light energy comprises a light emitting device, a reflector, and a support. The light emitting device is arranged to emit light energy. The reflector is arranged to reflect light energy emitted by the light emitting device and to direct the reflected light energy to the food. The support is arranged to support the light emitting device and the reflector relative to one another so that, when the light emitting device and the reflector have a first relative position, light energy is concentrated over the food so as to impart grill lines to the food, and so that, when the light emitting device and the reflector have a second relative position, light energy is distributed generally evenly over the food so as to substantially uniformly heat the food.

According to yet another aspect of the present invention, a food processing oven using light energy comprises an oven cabinet, a plurality of light emitting devices, a plurality of ellipsoidal reflectors, and a plurality of supports. Each of the light emitting devices is arranged to emit light energy. The ellipsoidal reflectors are arranged to reflect light energy emitted by the plurality of light emitting devices to food to be heated. The supports are arranged to support the plurality of light emitting devices and the plurality of ellipsoidal reflectors to the oven cabinet.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
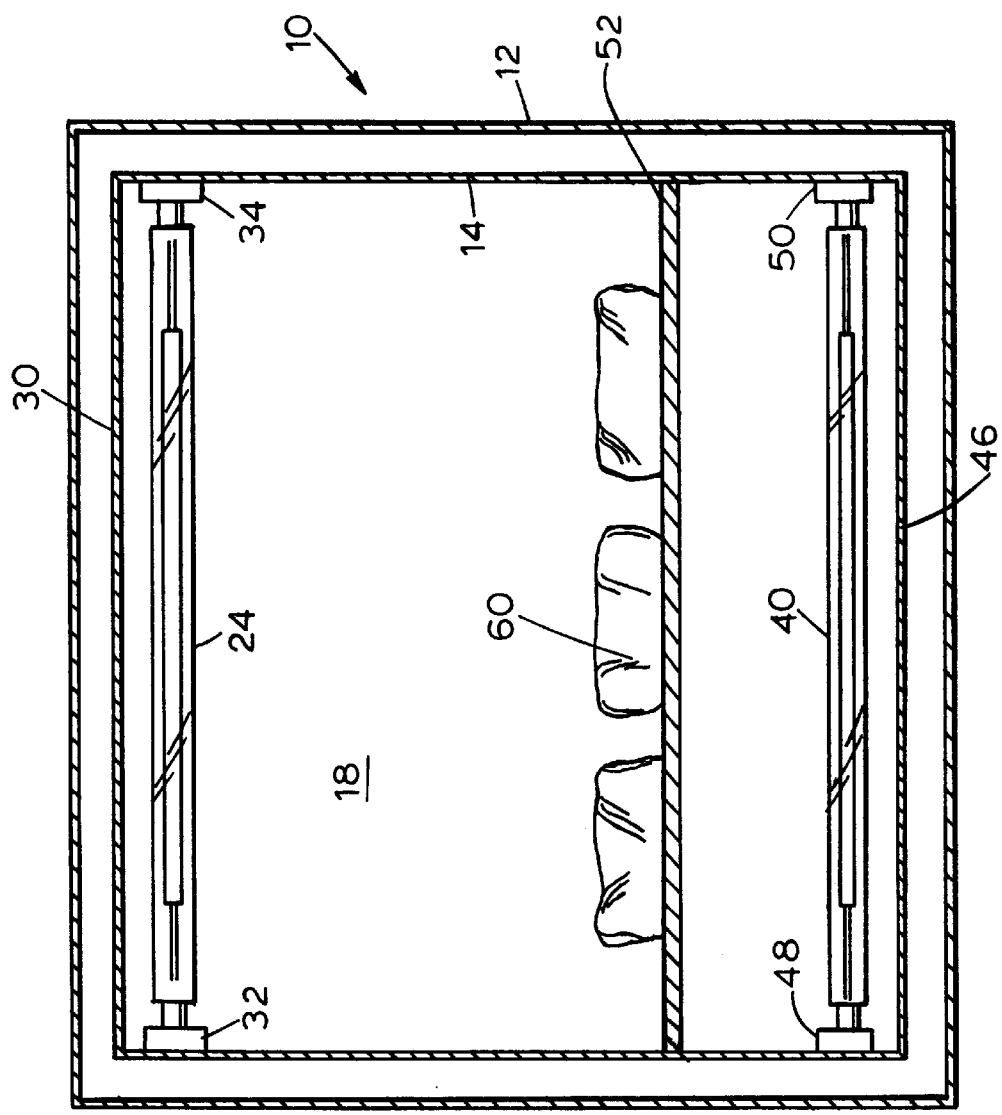
FIG. 1 is a frontal sectional view of a cooking apparatus incorporating the present invention.
Figure 2:
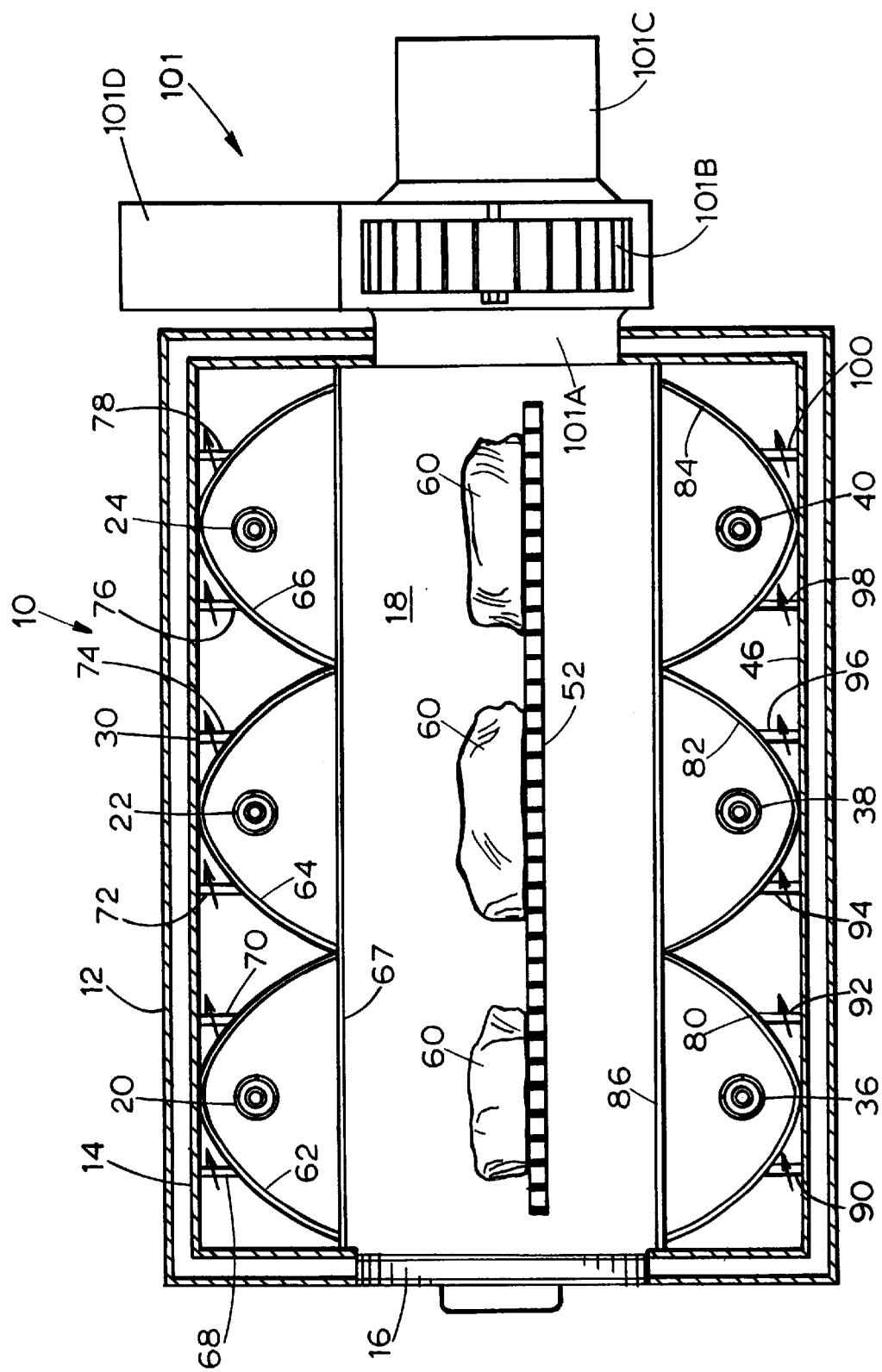
FIG. 2 is a side sectional view of the cooking apparatus illustrated in FIG. 1.

A heating appliance, which may take the form of an oven 10 and which may implement the present invention, is shown in FIGS. 1 and 2. The oven 10 includes an outer enclosure 12 and an inner enclosure 14. Suitable insulation (not shown) may be provided between the outer enclosure 12 and the inner enclosure 14. A door 16 (FIG. 2) provides access to a cooking compartment 18 within the inner enclosure 14 of the oven 10.

A plurality of light radiating lamps 20–24 within the oven 10 are positioned adjacent and parallel to a ceiling 30 of the oven 10. Each of the light radiating lamps 20–24 may be supported to the inner enclosure 14 of the oven 10 by socket terminals such as socket terminals 32 and 34 which support the light radiating lamp 24 to the inner enclosure 14 as shown in FIG. 1. During cooking, these socket terminals are used to provide electrical power to the light radiating lamps 20–24 in a conventional manner.

Similarly, a plurality of light radiating lamps 36–40 are positioned adjacent and parallel to a floor 46 of the inner enclosure 14 of the oven 10. As in the case of the light radiating lamps 20–24, the light radiating lamps 36–40 may be supported to the inner enclosure 14 by socket terminals such as socket terminals 48 and 50 which support the light radiating lamp 40 to the inner enclosure 14 as shown in FIG. 1. During cooking, these socket terminals are used to provide electrical power to the light radiating lamps 36–40 as is conventional.

Although only three light radiating lamps have shown along the ceiling 30, it should be understood that fewer or more light radiating lamps may be provided along the ceiling 30 for the oven 10. Moreover, although only three light radiating lamps have shown along the floor 46, it should be understood that fewer or more light radiating lamps may be provided along the floor 46 for the oven 10. Furthermore, each of the light radiating lamps 20–24 and the light radiating lamps 36–40 may be a Tungsten-Halogen light bulb.

The oven 10 includes a food support grill 52 which is supported by either side of the inner enclosure 14 by a conventional support. This support may be formed integrally with the inner enclosure 14 or it may be a separate element suitably attached to the inner enclosure 14. The food support grill 52, which may be a movable shelf such as a slidable shelf, supports food 60 to be cooked by the oven 10. The food support grill 52 may be a wire shelf, or the food support grill 52 may be of any suitable configuration.

The light radiating lamps 20–24 have corresponding ellipsoidal reflectors 62–66 functionally associated therewith. Accordingly, the ellipsoidal reflector 62 is functionally associated with the light radiating lamp 20, the ellipsoidal reflector 64 is functionally associated with the light radiating lamp 22, and the ellipsoidal reflector 66 is functionally associated with the light radiating lamp 24. A reflector and lamp shield 67 forms a barrier between the cooking compartment 18 on the one hand and the light radiating lamps 20–24 and the ellipsoidal reflectors 62–66 on the other. The reflector and lamp shield 67 may be a solid transparent material to protect the light radiating lamps 20–24 and the ellipsoidal reflectors 62–66 from spatters, grease, dirt, and the like.

The ellipsoidal reflectors 62–66 may be smooth as shown in FIGS. 1 and 2 or, for ease of manufacture, may be segmented or faceted. Moreover, as shown, each of the light radiating lamps 20–24 has a corresponding ellipsoidal reflector 62–66. Thus, if fewer or more light radiating lamps are provided, correspondingly fewer or more ellipsoidal reflectors also may be provided.

Figure 5:
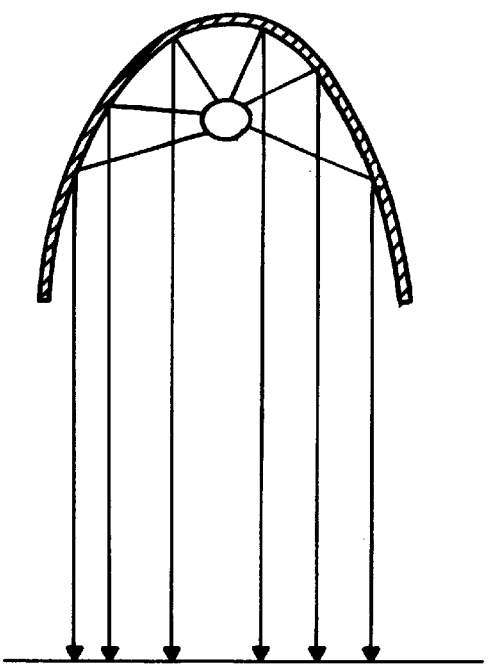
FIGS. 5–7 illustrate three positions of an ellipsoidal reflector with respect to a source of light; and, FIG. 8 illustrates an ellipsoidal reflector which is formed partially with a wall of a cooking apparatus.
Figure 6:
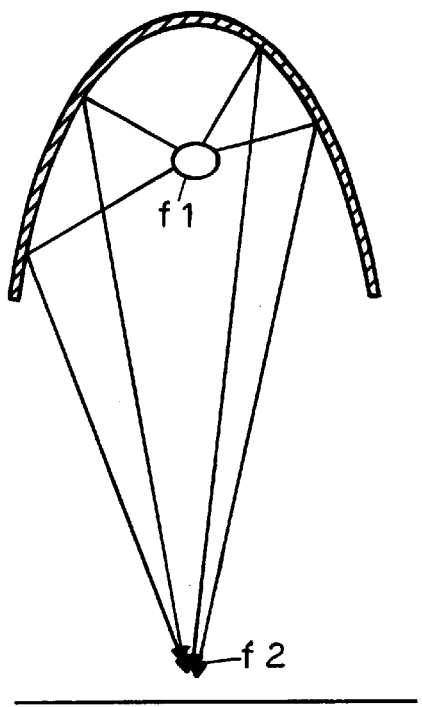
Figure 7:
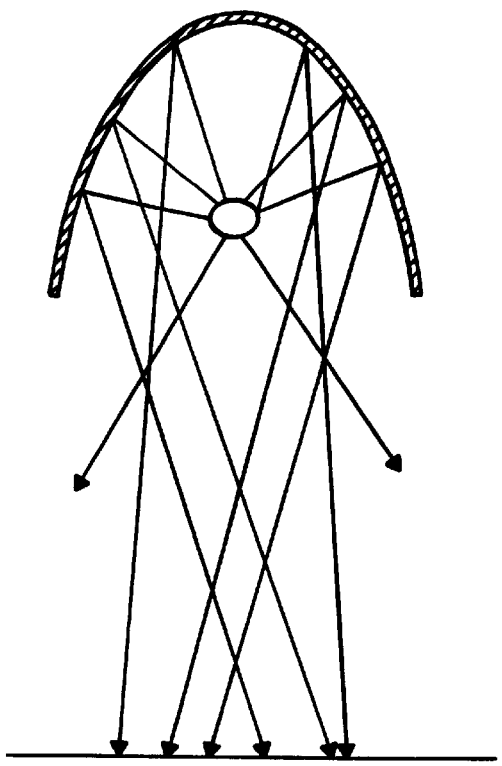

As is known, an ellipsoidal reflector has first and second focal points (such as a first focal point f1 and a second focal point f2 shown in FIG. 6). The first focal point may be closer to the reflector than the second focal point. When an object is at the first focal point, the object is focussed at the second focal point. On the other hand, when the object is not at the first focal point, the object is not focussed at the second focal point (such as shown in FIGS. 5 and 7).

The ellipsoidal reflectors 62–66 are supported to the ceiling 30 of the inner enclosure 14 by suitable corresponding adjustable brackets such as the adjustable brackets 68–78. Accordingly, the ellipsoidal reflector 62 is supported by the adjustable brackets 68 and 70, the ellipsoidal reflector 64 is supported by the adjustable brackets 72 and 74, and the ellipsoidal reflector 66 is supported by the adjustable brackets 76 and 78. Each of the ellipsoidal reflectors 62–66 is shown with a corresponding pair of adjustable brackets which preferably act in concert to adjust a corresponding ellipsoidal reflector with respect to its corresponding light radiating lamp. However, each of the ellipsoidal reflectors 62–66 may be supported by a single adjustable bracket, or all of the ellipsoidal reflectors 62–66 may be supported by a single adjustable bracket.

The adjustable brackets 68–78 are adjustable so that the ellipsoidal reflectors 62–66 have first and second positions. As the position of the ellipsoidal reflectors 62–66 is adjusted by the adjustable brackets 68–78, the position of the reflector and lamp shield 67, which may be attached to the ellipsoidal reflectors 62–66, may be likewise adjusted.

When the adjustable brackets 68–78 are adjusted so that the ellipsoidal reflectors 62–66 are in their first positions, the light radiating lamps 20–24 are at the first focal points of their corresponding ellipsoidal reflectors 62–66. When the light radiating lamps 20–24 are at the first focal points of their respective ellipsoidal reflectors 62–66, the light energy which is emitted by the light radiating lamps 20–24 and which is reflected by the ellipsoidal reflectors 62–66 is focussed at the second focal point of the corresponding ellipsoidal reflectors 62–66, as shown in FIG. 6. If the ellipsoidal reflectors 62–66 are elongated along the length of their corresponding light radiating lamps 20–24, and if the oven 10 is arranged so that the second focal points of the ellipsoidal reflectors 62–66 is at the food 60, the light energy reflected by the ellipsoidal reflectors 62–66 is concentrated along parallel lines on the food 60. After sufficiently long exposure to these parallel lines of light energy, a charbroiled appearance, similar to those produced by gas or electric cooking grills, may be imparted to the food 60.

When the adjustable brackets 68–78 are adjusted so that the ellipsoidal reflectors 62–66 are in their second positions, the light radiating lamps 20–24 are not at the first or second focal points of their corresponding ellipsoidal reflectors 62–66. Accordingly, the light energy which is emitted by the light radiating lamps 20–24 and which is reflected by the ellipsoidal reflectors 62–66 is not focussed at the second focal point of the corresponding ellipsoidal reflectors 62–66, as shown in FIGS. 5 and 7. For example, the second positions of the ellipsoidal reflectors 62–66 may be arranged so that the light energy reflected by the ellipsoidal reflectors 62–66 is distributed more evenly throughout the cooking compartment 18 of the oven 10. More specifically, the second positions of the ellipsoidal reflectors 62–66 may be arranged so that light energy emitted by the light radiating lamps 20–24 is reflected from the ellipsoidal reflectors 62–66 in parallel, as shown in FIG. 5. Accordingly, when the ellipsoidal reflectors 62–66 are in their second positions, the food 60 may be more uniformly heated by the light radiating lamps 20–24.

The light radiating lamps 36–40 have corresponding ellipsoidal reflectors 80–84 functionally associated therewith. Accordingly, the ellipsoidal reflector 80 is functionally associated with the light radiating lamp 36, the ellipsoidal reflector 82 is functionally associated with the light radiating lamp 38, and the ellipsoidal reflector 84 is functionally associated with the light radiating lamp 40. A reflector and lamp shield 86 forms a barrier between the cooking compartment 18 on the one hand and the light radiating lamps 36–40 and the ellipsoidal reflectors 80–84 on the other. The reflector and lamp shield 86 may be a solid transparent material to protect the light radiating lamps 36–40 and the ellipsoidal reflectors 80–84 from spatters, grease, dirt, and the like.

As in the case of the ellipsoidal reflectors 62–66, the ellipsoidal reflectors 80–84 may be smooth as shown in FIGS. 1 and 2 or may be segmented. Also as in the case of the ellipsoidal reflectors 62–66, the ellipsoidal reflectors 80–84 have first and second focal points. Moreover, as shown, each of the light radiating lamps 36–40 has a corresponding ellipsoidal reflector 80–84. Thus, if fewer or more light radiating lamps are provided, correspondingly fewer or more ellipsoidal reflectors also may be provided.

The ellipsoidal reflectors 80–84 are supported to the floor 46 of the inner enclosure 14 by suitable corresponding adjustable brackets 90–100. Accordingly, the ellipsoidal reflector 80 is supported by the adjustable brackets 90 and 92, the ellipsoidal reflector 82 is supported by the adjustable brackets 94 and 96, and the ellipsoidal reflector 84 is supported by the adjustable brackets 98 and 100. As in the case of the ellipsoidal reflectors 62–66, each of the ellipsoidal reflectors 80–84 is shown with a corresponding pair of adjustable brackets which preferably act in concert to adjust a corresponding ellipsoidal reflector with respect to its corresponding light radiating lamp. However, each of the ellipsoidal reflectors 80–84 may be supported by a single adjustable bracket, or all of the ellipsoidal reflectors 80–84 may be supported by a single adjustable bracket.

The adjustable brackets 90–100 are adjustable so that the ellipsoidal reflectors 80–84 have first and second positions. As the position of the ellipsoidal reflectors 80–84 is adjusted by the adjustable brackets 90–100, the position of the reflector and lamp shield 86, which may be attached to the ellipsoidal reflectors 80–84, may be likewise adjusted.

When the adjustable brackets 90–100 are adjusted so that the ellipsoidal reflectors 80–84 are in their first positions, the light radiating lamps 36–40 are at the first focal point of their corresponding ellipsoidal reflectors 80–84 so that the ellipsoidal reflectors 80–84 focus reflected light energy which is emitted by the light radiating lamps 36–40 at their second focal points, as shown in FIG. 6. Accordingly, the underside of the food 60 may be given a charbroiled appearance similar to those produced by gas or electric cooking grills.

When the adjustable brackets 90–100 are adjusted so that the ellipsoidal reflectors 80–84 are in their second positions, the light radiating lamps 36–40 are not at the first or second focal points of their corresponding ellipsoidal reflectors 80–84. Accordingly, the light energy which is reflected by the ellipsoidal reflectors 80–84 is distributed more evenly throughout the cooking compartment 18 of the oven 10, as shown in FIG. 5.

The oven 10 may also have a venting system 101 including a filter screen 101A, a fan 101B, a fan motor 101C, and a vent 101D. When energized, the fan motor 101C drives the fan 101B in order to draw air from within the inner enclosure 14 of the oven 10 through the filter screen 101A and out through the vent 101D.

Figure 3:
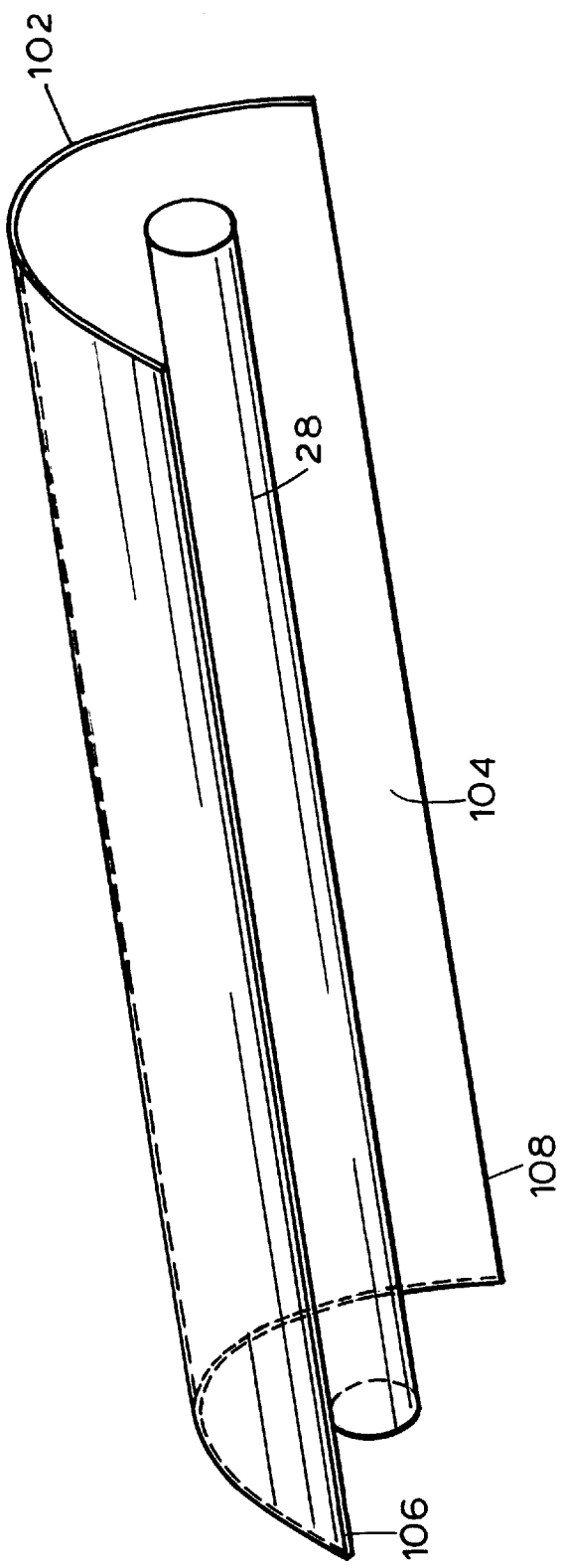
FIG. 3 is an isometric view of an ellipsoidal reflector according the present invention.
Figure 4:
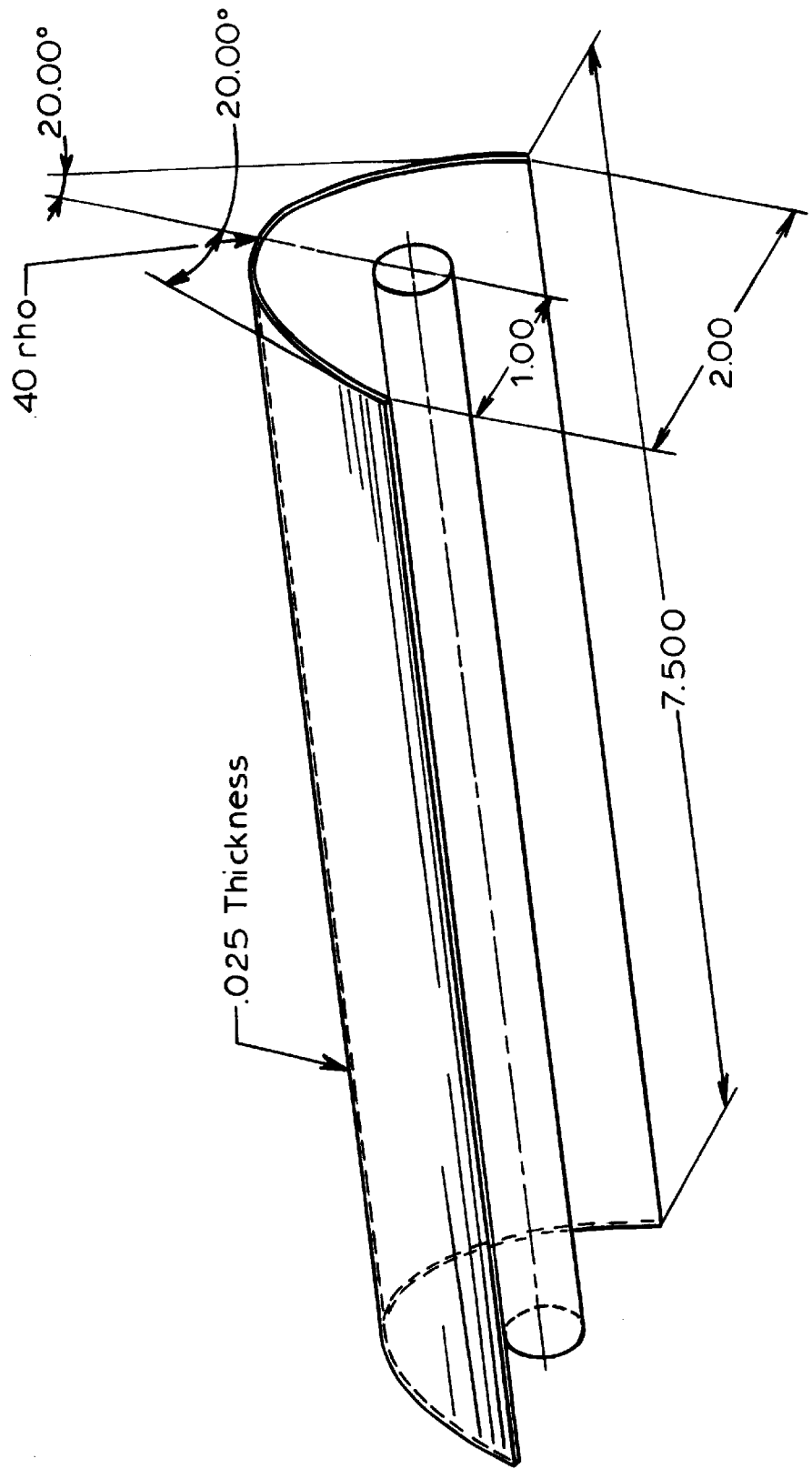
FIG. 4 illustrates an exemplary set of dimensions for the ellipsoidal reflector shown in FIG. 3.

An example of an ellipsoidal reflector 102, which can be used for the ellipsoidal reflectors 62–66 and the ellipsoidal reflectors 80–84, is shown in FIG. 3. Furthermore, an exemplary set of dimensions for the ellipsoidal reflector 102 is shown in FIG. 4. These dimensions may be in any desired units. The ellipsoidal reflector 102, as shown in FIG. 3, may be formed from a sheet of reflecting material 104 having ends 106 and 108. This material, for example, may be anodized aluminum. As shown in FIG. 4, the sheet of reflecting material may have a thickness of 0.025. The sheet of reflecting material 104 is bent, molded, stamped, extruded, or otherwise into an ellipsoidal shape having the angles shown in FIG. 4.

Figure 8:
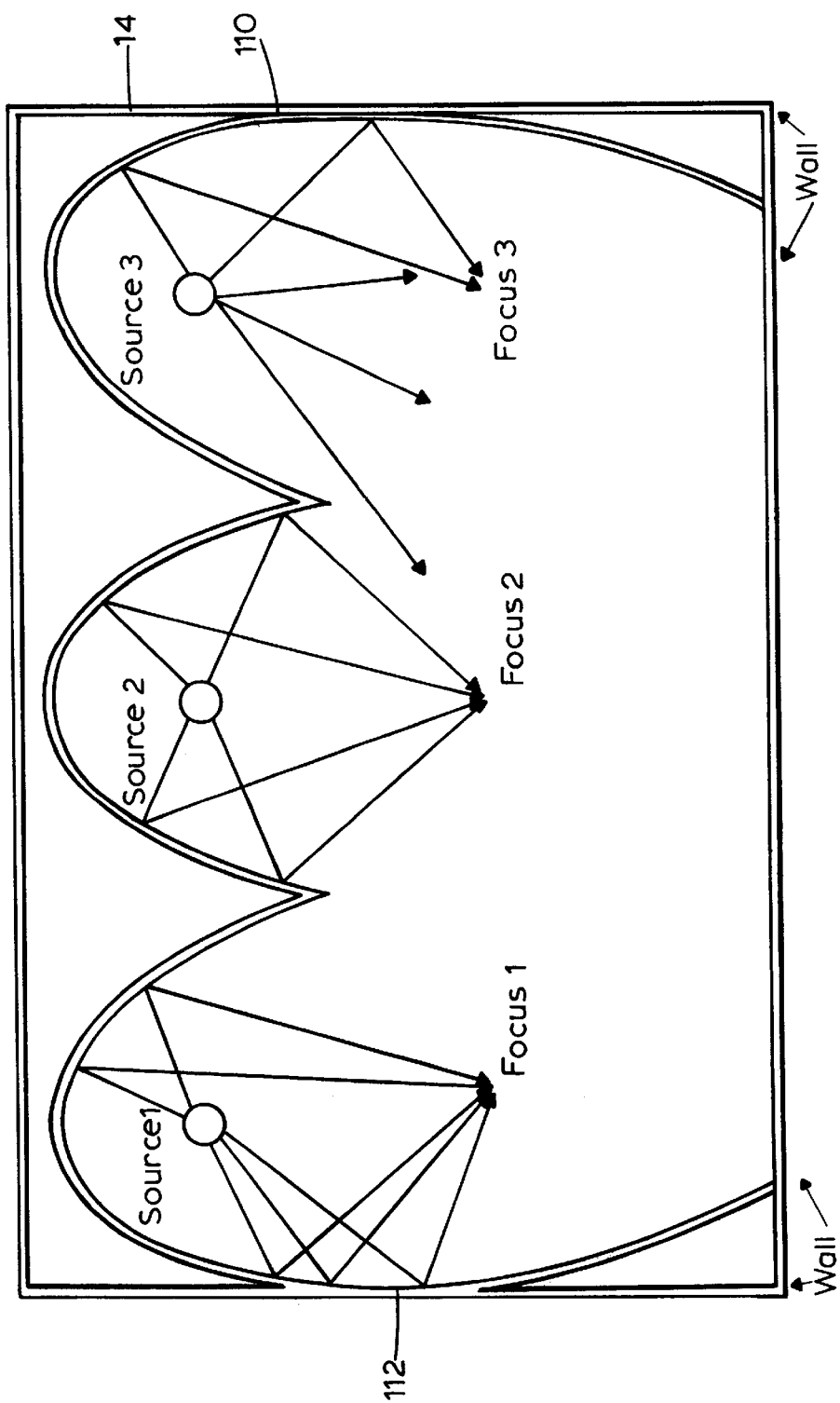

Certain modifications of the present invention have been discussed above. Other modifications will occur to those practicing in the art of the present invention. For example, only ceiling mounted light radiating lamps and ellipsoidal reflectors may be used as illustrated in FIG. 8. Also, one of more of the ellipsoidal reflectors 62–66 may be formed, at least partly, by the inner enclosure 14 as shown at portions 110 and 112 of FIG. 8. On the other hand, if both ceiling and floor mounted light radiating lamps and ellipsoidal reflectors are be used as illustrated in FIG. 2, one of more of the ellipsoidal reflectors may be formed, at least partly, by the inner enclosure 14.

Also, as illustrated in the drawings, the ellipsoidal reflectors 62–66 may be arranged so that they abut one another, and the ellipsoidal reflectors 80–84 may be similarly arranged so that they abut one another. Accordingly, when these ellipsoidal reflectors are positioned in their second positions, light energy is distributed more evenly over the food 60.

Additionally, although the ellipsoidal reflectors 62–66 and the ellipsoidal reflectors 80–84 are shown as discrete ellipsoidal reflectors, the ellipsoidal reflectors 62–66 may instead be formed from a continuous sheet of reflecting material, and the ellipsoidal reflectors 80–84 may instead be formed from a continuous sheet of reflecting material. On the other hand, all of the ellipsoidal reflectors 62–66 and 80–84 may instead be formed from a continuous sheet of reflecting material.

Moreover, the adjustable brackets 90–100 have been described above as being adjustable so that the ellipsoidal reflectors 80–84 have first and second positions. Accordingly, the light radiating lamps 20–24 and 36–40 may simultaneously be used to impart a charbroiled appearance to the top and bottom of the food 60. However, because the light radiating lamps 36–40 need not be used to broil, the adjustable brackets 90–100 need not be adjustable, and instead may be arranged to position the ellipsoidal reflectors 80–84 so that light energy reflected from the light radiating lamps 36–40 is distributed evenly within the cooking compartment 18.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A food processing oven using light energy comprising:
   an oven cabinet;
   a light emitting device arranged to emit light energy;
   an ellipsoidal reflector arranged to reflect light energy emitted by the light emitting device to food to be heated; and,
   a support arranged to support the light emitting device and the ellipsoidal reflector to the oven cabinet.

2. The food processing oven of claim 1 wherein the ellipsoidal reflector has first and second focal points, wherein the ellipsoidal reflector is arranged so that light energy at the first focal point is reflected and concentrated at the second focal point, and wherein the first focal point is closer to the ellipsoidal reflector than is the second focal point.

3. The food processing oven of claim 2 wherein the support is arranged to support the ellipsoidal reflector and the light emitting device in first and second relative positions such that, when the ellipsoidal reflector and the light emitting device are in the first relative position, the reflected light energy is reflected by the ellipsoidal reflector and is concentrated at the second focal point, and such that, when the ellipsoidal reflector and the light emitting device are in the second relative position, the reflected light energy is reflected by the ellipsoidal reflector substantially as parallel light energy.

4. The food processing oven of claim 3 wherein the oven cabinet has walls defining a cooking chamber, and wherein at least one of the walls of the oven cabinet is arranged to form at least part of the ellipsoidal reflector.

5. The food processing oven of claim 1 wherein the support is arranged to support the ellipsoidal reflector and light emitting device in first and second relative positions such that, when the ellipsoidal reflector and the light emitting device are in the first relative position, the reflected light energy is reflected by the ellipsoidal reflector and is concentrated on the food to be heated, and such that, when the ellipsoidal reflector and the light emitting device are in the second relative position, the reflected light energy is reflected by the ellipsoidal reflector substantially as parallel light energy.

6. The food processing oven of claim 5 wherein the oven cabinet has walls defining a cooking chamber, and wherein at least one of the walls of the oven cabinet is arranged to form at least part of the ellipsoidal reflector.

7. The food processing oven of claim 6 wherein the ellipsoidal reflector is arranged to concentrate the reflected light energy on the food to be heated which is farther away from the ellipsoidal reflector than is the light emitting device.

8. The food processing oven of claim 1 wherein the ellipsoidal reflector is arranged to concentrate the reflected light energy on the food to be heated which is farther away from the ellipsoidal reflector than is the light emitting device.

9. The food processing oven of claim 1 wherein the oven cabinet has walls defining a cooking chamber, and wherein at least one of the walls of the oven cabinet is arranged to form at least part of the ellipsoidal reflector.

10. A food cooking apparatus for cooking food by the use of light energy comprising:
    a light emitting device arranged to emit light energy;
    a reflector arranged to reflect light energy emitted by the light emitting device and to direct the reflected light energy to the food; and,
    a support arranged to support the light emitting device and the reflector relative to one another so that, when the light emitting device and the reflector have a first relative position, light energy is concentrated over the food so as to impart grill lines to the food, and so that, when the light emitting device and the reflector have a second relative position, light energy is distributed generally evenly over the food so as to generally uniformly heat the food.

11. The food cooking apparatus of claim 10 wherein the reflector has first and second focal points, wherein the light emitting device is at the first focal point, and wherein the first focal point is closer to the reflector than is the second focal point.

12. The food cooking apparatus of claim 11 further comprising a cabinet, wherein the cabinet has walls defining a cooking chamber, and wherein at least one of the walls of the cabinet is arranged to form at least part of the reflector.

13. The food cooking apparatus of claim 10 further comprising a cabinet, wherein the cabinet has walls defining a cooking chamber, and wherein at least one of the walls of the cabinet is arranged to form at least part of the reflector.

14. A food processing oven using light energy comprising:
    an oven cabinet;
    a plurality of light emitting devices, wherein each of the light emitting devices is arranged to emit light energy;
    a plurality of ellipsoidal reflectors arranged to reflect light energy emitted by the plurality of light emitting devices to food to be heated; and,
    a plurality of supports arranged to support the plurality of light emitting devices and the plurality of ellipsoidal reflectors to the oven cabinet.

15. The food processing oven of claim 14 wherein the ellipsoidal reflectors have corresponding first and second focal points, wherein the ellipsoidal reflectors are arranged so that light energy at the first focal points is reflected and concentrated at the second focal points, and wherein the first focal points are closer to the corresponding ellipsoidal reflectors than are the corresponding second focal points.

16. The food processing oven of claim 15 wherein the supports are arranged to support corresponding ellipsoidal reflectors and light emitting devices in first and second relative positions such that, when the corresponding ellipsoidal reflectors and light emitting devices are in the first relative positions, the reflected light energy is reflected by the ellipsoidal reflectors and is concentrated at the second focal points, and such that, when the corresponding ellipsoidal reflectors and light emitting devices are in the second relative positions, the reflected light energy is reflected by the ellipsoidal reflectors substantially as parallel light energy.

17. The food processing oven of claim 16 wherein the oven cabinet has walls defining a cooking chamber, and wherein at least one of the walls is arranged to form at least part of the ellipsoidal reflectors.

18. The food processing oven of claim 14 wherein the supports are arranged to support corresponding ellipsoidal reflectors and light emitting devices in first and second relative positions such that, when the corresponding ellipsoidal reflectors and light emitting devices are in the first relative positions, the reflected light energy is reflected by the ellipsoidal reflectors and is concentrated at the second focal points, and such that, when the corresponding ellipsoidal reflectors and light emitting devices are in the second relative positions, the reflected light energy is reflected by the ellipsoidal reflectors substantially as parallel light energy.

19. The food processing oven of claim 18 wherein the oven cabinet has walls defining a cooking chamber, and wherein at least one of the walls is arranged to form at least part of the ellipsoidal reflectors.

20. The food processing oven of claim 14 wherein the oven cabinet has walls defining a cooking chamber, and wherein at least one of the walls is arranged to form at least part of the ellipsoidal reflectors.

* * * * *